(12) United States Patent
Parmeter et al.

(10) Patent No.: US 7,679,242 B2
(45) Date of Patent: Mar. 16, 2010

(54) SHRINK TUBE ENCAPSULATED MAGNET WIRE FOR ELECTRICAL SUBMERSIBLE MOTORS

(75) Inventors: Larry J. Parmeter, Broken Arrow, OK (US); John M. Knapp, Claremore, OK (US)

(73) Assignee: Baker Hughes Incorporated, Houston, TX (US)

( * ) Notice: Subject to any disclaimer, the term of this patent is extended or adjusted under 35 U.S.C. 154(b) by 362 days.

(21) Appl. No.: 11/866,694

(22) Filed: Oct. 3, 2007

(65) Prior Publication Data

US 2009/0091202 A1 Apr. 9, 2009

(51) Int. Cl.
*H02K 5/10* (2006.01)
(52) U.S. Cl. ............... 310/87; 310/88; 310/45; 310/184
(58) Field of Classification Search ........... 310/45, 310/87–88, 194, 179, 184, 208, 201, 71
See application file for complete search history.

(56) References Cited

U.S. PATENT DOCUMENTS

| | | | | |
|---|---|---|---|---|
| 2,476,937 A * | 7/1949 | White | ................. | 427/58 |
| 2,749,456 A * | 6/1956 | Luenberger | ............. | 310/43 |
| 3,235,825 A * | 2/1966 | Davis, Jr. | .............. | 336/205 |
| 3,867,658 A * | 2/1975 | Dochterman | ............. | 310/71 |
| 3,912,957 A * | 10/1975 | Reynolds | ............... | 310/71 |
| 3,974,407 A * | 8/1976 | Dochterman | ............. | 310/71 |
| 4,191,240 A | 3/1980 | Rule et al. | | |
| 4,219,748 A * | 8/1980 | Sakaguchi et al. | ............ | 310/71 |
| 4,749,894 A * | 6/1988 | Iwata et al. | .................. | 310/87 |
| 4,833,354 A * | 5/1989 | Miller | .................. | 310/87 |
| 4,881,909 A * | 11/1989 | Blackman | ................. | 439/191 |
| 5,079,467 A * | 1/1992 | Dorman | ................ | 310/156.12 |
| 5,319,269 A | 6/1994 | Bryant | | |
| 6,713,924 B1 | 3/2004 | Fukushima | | |
| 7,141,908 B2 * | 11/2006 | Holmstrom et al. | ....... | 310/254.1 |
| 2006/0125344 A1 | 6/2006 | Yokota et al. | | |

FOREIGN PATENT DOCUMENTS

| | | |
|---|---|---|
| JP | 2005-245155 | 9/2005 |
| JP | 2006-050821 | 2/2006 |

* cited by examiner

*Primary Examiner*—Thanh Lam
(74) *Attorney, Agent, or Firm*—Fellers, Snider, Blankenship, Bailey & Tippens, P.C.

(57) ABSTRACT

An electrical motor for an electrical submersible pump wherein the electrical motor has increased heat transfer capabilities. The electrical motor includes a housing and a plurality of stator laminations within the housing. Each stator lamination defines a central orifice and a plurality of lamination slots. A plurality of magnet wires pass through each of the plurality of lamination slots formed by the stacked plurality of stator laminations. Shrink wrap surrounds each of the plurality of magnet wires to secure the magnet wires in bundles. The result is that the wires are effectively bound together in a manner that allows oil to move freely inside the lamination slots surrounding the wire bundles. Since fluid can pass between and around the windings, the overall winding temperature will be normalized, essentially reducing hot spots that occur in prior art designs.

11 Claims, 3 Drawing Sheets

SHRINK TUBE ENCAPSULATED MAGNET WIRE FOR ELECTRICAL SUBMERSIBLE MOTORS

FIELD OF THE INVENTION

The invention relates generally to the field of electrical submersible pump motors. More particularly, the invention relates to increasing heat transfer for cooling electrical submersible pump motors.

BACKGROUND OF THE INVENTION

In an electrical submersible pumping unit, an electric submersible motor is typically used to drive an attached centripetal pump. The electrical submersible pump unit is placed down the well bore of an oil well and is used to push oil to the surface.

The motors are typically filled with a highly refined mineral oil or synthetic with high dielectric strength. The design and operating voltage of these motors typically range from 230 volt up to 7,200 volts. Amperage requirement typically varies from 12 to 200 amps. The required horsepower may be achieved by increasing the length, or diameter, of the motor section. Larger single motor assemblies have been known to exceed 100 feet in length and rated up to 400 horsepower, while tandem motors have been known to approach 90 feet in length and have a rating up to 750 horsepower or greater. Other dimensions and power output are also possible.

The motor is made up of rotors, usually about 12 to 18 inches in length, that are mounted on a shaft and separated by a rotor bearing. Rotor bearings keep the rotating components centered in the stator. The high dielectric oil that fills the motor lubricates the bearings and aids in heat transfer. The rotors are located in an electromagnetic field provided by a stator mounted within the housing.

The stator is composed of a multitude of individual laminations that, along with stator windings that include strands of magnet wire, function as electromagnets. The laminations form a hollow cylinder with one pole of each electromagnet facing toward the center. While no physical movement of the stator takes place, electrical movement is created by progressively changing the polarity of the stator poles in such a manner that their combined magnetic field rotates. In an AC motor, this is easily accomplished since reversing the current each half-cycle will automatically change the polarity of each stator pole.

The rotor also has a group of electromagnets arranged in a cylinder with the poles facing the stator poles. The rotor rotates simply by magnetic attraction and repulsion as the rotor poles attempt to follow the rotating electrical field being generated by the stator. Typically, there is no external electrical connection to the rotor. Instead, the current flow through the rotor is induced by a magnetic field created in the stator.

The multitude of stator laminations that are stacked together and inserted inside a motor housing define a plurality of wire orifices or lamination slots that are filled with the stator windings that include strands of magnet wire. The laminations are typically made from steel. Each strand of wire is covered with a high dielectric coating so that the wires will not short out against one another. Also, a high dielectric tubing or slot liner is typically inserted inside the lamination slots to further protect the wire. Electric motor windings tend to vibrate, which can cause the wires to abrade against one another. If the dielectric coating of the wires is rubbed off, then an electrical short will result. To prevent this, the lamination slots have traditionally been filled with varnish or epoxy that encapsulates the wires into a single mass to prevent the wires from rubbing together.

Three phase induction type motors typically generate a lot of heat. The heat must be removed or the motor will quickly overheat and fail. The high dielectric oil that fills the motor aids in heat transfer. The motor is cooled by conducting heat from inside the motor to the outside of the housing where well fluid flows past the motor to carry the heat away via conduction, convection, and radiation. One drawback with using a material to encapsulate the wires is that the encapsulation material impedes heat dissipation.

SUMMARY OF THE INVENTION

Therefore, the invention relates to increasing heat transfer of an electrical motor of an electrical submersible pump. The electrical submersible pump assembly of the invention is lowered into casing, wherein the electrical submersible pump assembly including an electrical motor for driving a centrifugal pump. The electrical motor includes a housing and a plurality of stator laminations within the housing. Each stator lamination defines a central orifice and a plurality of wire orifices or lamination slots. A shaft passes through the central orifice of the plurality of stator laminations. A plurality of rotors are mounted on the shaft and located within a central space defined by the central orifice of each of the stacked plurality of stator laminations.

A plurality of magnet wires pass through each of the plurality of lamination slots formed by the stacked plurality of stator laminations. A shrink wrap surrounds each of the plurality of magnet wires to secure the magnet wires in bundles.

In practice, the shrink wrap is inserted into the lamination slots of the stator laminations in the electrical motor. The stator laminations, shrink wrap and the magnet wires are heated to shrink the shrink wrap onto an outside of the magnet wire, whereby the magnet wires are secured in bundles by the shrink wrap.

The result is that the wires are effectively bound together in a manner that allows oil to move freely in the open space surrounding the wire bundles inside the lamination slots. Since fluid can pass between and around the windings, the overall winding temperature will be normalized, essentially reducing hot spots that tend to occur in prior art designs.

DETAILED DESCRIPTION OF THE PREFERRED EMBODIMENTS

Figure 1:
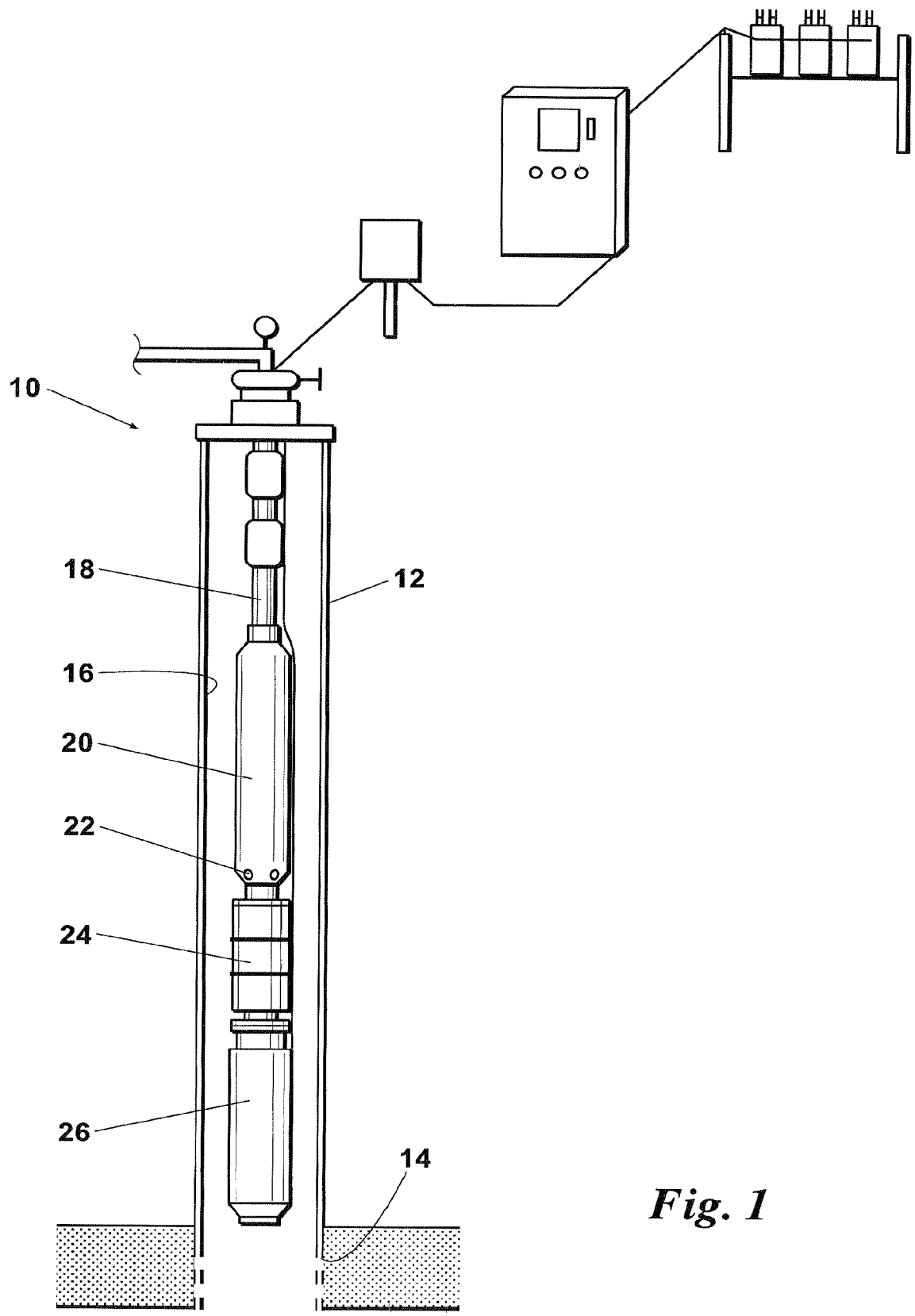
FIG. 1 is a schematic view of a well with a deployed electrical submersible pump.

Referring first to FIG. 1, shown is a well 10 wherein casing 12 surrounds a well bore. Perforations 14 are made in the casing to allow an influx of well fluids. An electrical submersible pump assembly 16 is lowered into well 10 on tubing 18. Electrical submersible pump assembly 16 includes pump 20 having pump intakes 22 for drawing in well fluids. A seal section 24 separates pump 20 from motor 26. Well fluids are pumped to the surface by pump 20 through tubing 18.

Figure 2:
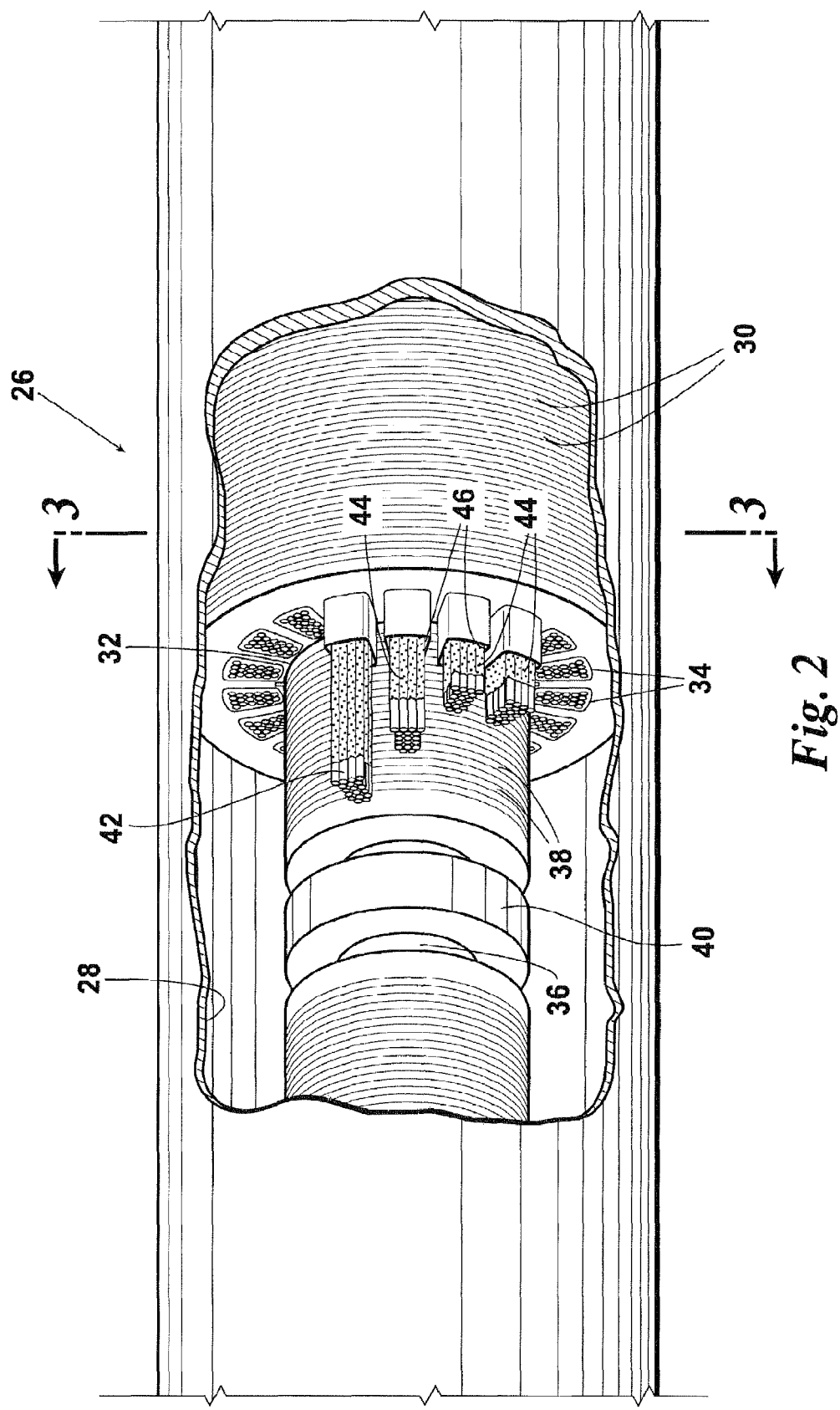
FIG. 2 is a partial cutaway perspective view of a motor of the electrical submersible pump of FIG. 1.
Figure 3:
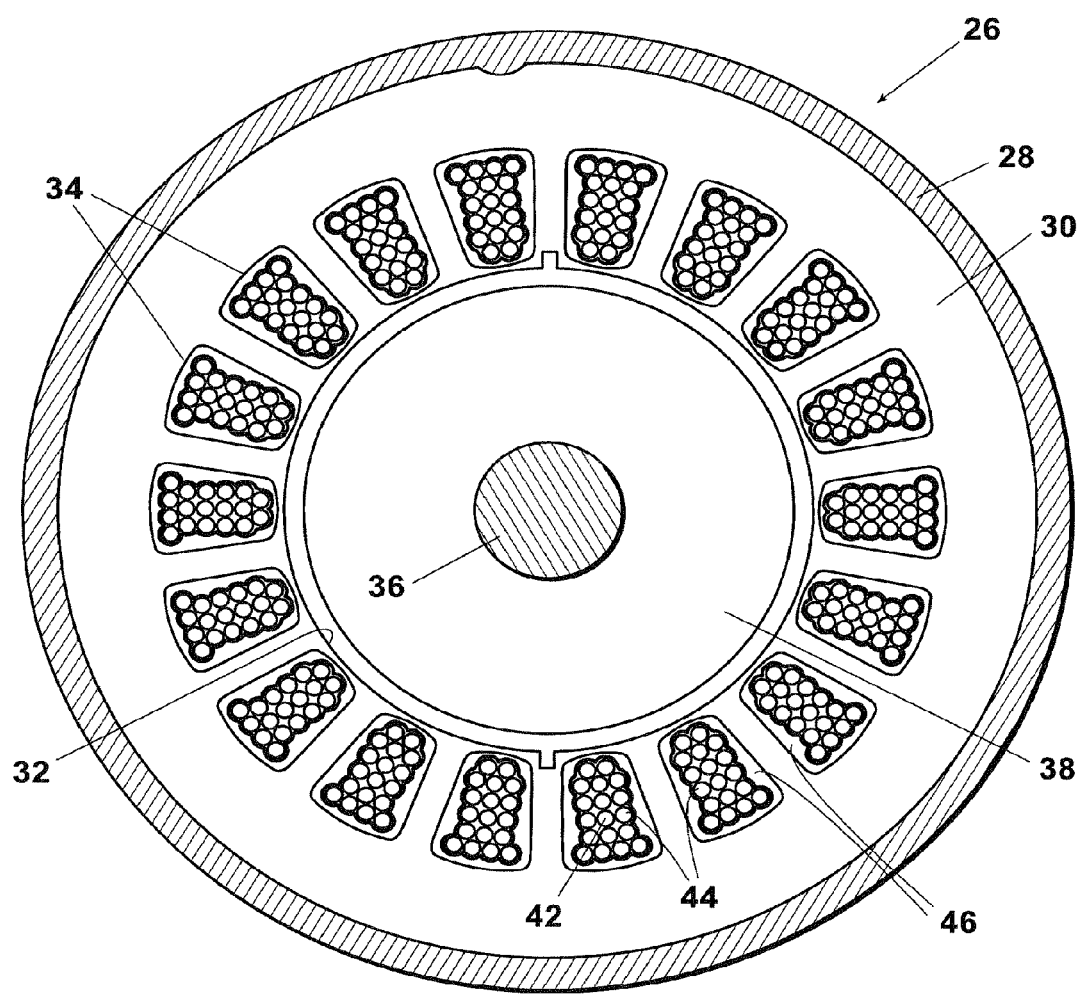
FIG. 3 is a cross-sectional view, taken along lines 3-3 of FIG. 2 showing stator windings in wire orifices or lamination slots defined by stator laminations.

Referring now primarily to FIGS. 2 and 3, electrical motor 26 comprises a housing 28 and a plurality of stator laminations 30. Stator laminations 30 each define a central orifice 32 (FIG. 3) and a plurality of wire orifices or lamination slots 34. A shaft 36 passes through central orifice 32 of the plurality of stator laminations 30.

A plurality of rotors 38 are mounted on shaft 36. Rotors 38 rotate within a central space defined by the central orifice 32 of each of the plurality of stator laminations 30. Radial bearing 40 (FIG. 2) surrounds shaft 36. Stator windings that include a plurality of magnet wires 42 pass through each of the plurality of lamination slots 34 in each of the plurality of stator laminations 30. Shrinkable material, such as a shrink wrap or shrink tubing 44 is provided that surrounds each of the plurality of magnet wires 42 for tightly securing magnet wires 42 in bundles. In one application, shrink tubing 42 is preferably made of poly ether ether ketone or poly aryl ether ketone, commonly referred to as "PEEK," having a thickness of 0.007 inches, although other materials and thicknesses may also be used. Depending on variables including anticipated operating temperatures, voltage requirements, etc., the particular material and thickness of the material may vary. Other heat shrink materials could be used in other applications. Additional possible example materials include, but are not limited to, PEEKHT, Kynar® (PVDF or polyvinylidene fluoride), Viton®, polyolefin, PVC (polyvinyl chloride), neoprene, PTFE (polytetrafluroethylene), and FEP (fluorinated ethylene-propylene). Further, multiple layers of shrink wrap or shrink tubing 44 may be used if desired.

An advantage associated with using shrink tubing 44 is that magnet wires 42 are secured within lamination slots 34 such that space 46 (FIG. 3) remains between shrink tubing 44 and the inside of lamination slots 34. Space 46 permits flow of dielectric fluid through lamination slots 34, which facilitates improved heat transfer.

In practice, before magnet wires 42 are inserted in lamination slots 34, shrink tubing 44 is inserted into each of lamination slots 34. Next, stator windings that include magnet wires 42 are inserted inside shrink tubing 44. Magnet wires 42 are then heated to a temperature that causes the shrink tubing 44 to shrink against magnet wires 42.

Advantages of the invention include protecting magnetic wire 42 from abrasion during motor operation by bundling wires 42 together with shrink tubing 44. A further advantage is that varnish or epoxy that has traditionally been used to immobilize magnetic wire 42 is eliminated, thereby allowing dielectric oil to move freely through open space surrounding shrink tubing 44 inside of lamination slots 34. The heated oil may then migrate to cooler areas near housing 28, which results in greatly increased heat transfer. Since the dielectric fluid is able to pass between and around magnetic wire 42, the overall temperature of magnetic wire 42 is normalized, thereby reducing hot spots that tend to occur in varnish or epoxy filled lamination slots 34.

Thus, the present invention is well adapted to carry out the objectives and attain the ends and advantages mentioned above as well as those inherent therein. While presently preferred embodiments have been described for purposes of this disclosure, numerous changes and modifications will be apparent to those of ordinary skill in the art. Such changes and modifications are encompassed within the spirit of this invention as defined by the claims.

What is claimed is:

1. A well comprising:
a wellhead;
casing extending downwards below said wellhead;
an electrical submersible pump assembly lowered into said casing, said electrical submersible pump assembly including an electrical motor for driving a centrifugal pump, wherein said electrical motor comprises:
a housing;
a plurality of stator laminations within said housing, each defining a central orifice and a plurality of lamination slots;
a plurality of rotors within a central space defined by said central orifice of each of said plurality of stator laminations, said plurality of rotors for rotating relative to said plurality of stator laminations;
magnet wires passing through each of said plurality of lamination slots in each of said plurality of stator laminations;
a shrink wrap surrounding magnet wires for securing said magnet wires in bundles;
wherein space between said shrink wrap surrounding said magnet wires and an inside of said lamination slots permits fluid to flow past said magnet wires in said lamination slots.

2. The well according to claim 1 wherein:
said shrink wrap is a shrink tube.

3. The well according to claim 1 wherein:
said shrink wrap is comprised of PEEK.

4. The well according to claim 1 further comprising:
an additional layer of shrink wrap surrounding said shrink wrap surrounding said magnet wires.

5. An electrical motor for a submersible pump assembly, said electrical motor comprising:
a housing;
a plurality of stator laminations within said housing, each defining a central orifice and a plurality of lamination slots;
a plurality of rotors within a central space defined by said central orifice of each of said plurality of stator laminations;
magnet wires passing through each of said plurality of lamination slots in each of said plurality of stator laminations;
a shrink wrap surrounding said magnet wires for securing said magnet wires in bundles;
wherein space between said shrink wrap surrounding said plurality of magnet wires and an inside of said lamination slots permits fluid to pass through said lamination slots.

6. The electrical motor according to claim 5 wherein:
said shrink wrap is a shrink tube.

7. The electrical motor according to claim 5 wherein:
said shrink wrap is comprised of PEEK.

8. The electrical motor according to claim 5 further comprising:
an additional layer of shrink wrap surrounding said shrink wrap surrounding said magnet wires.

9. A method of increasing heat transfer capabilities in an electrical motor of an electrical submersible pump, said method comprising the steps of:
inserting shrink wrap into lamination slots of stator laminations in the electrical motor;
inserting a plurality of magnet wires into said lamination slots of said stator laminations;
heating said magnet wires for shrinking said shrink wrap onto an outside of said magnet wires wherein said magnet wires are secured in bundles such that space between said shrink wrap and an inside of said lamination slots permits fluids to flow around said wire bundles within said lamination slots.

10. The method according to claim 9 wherein:
said shrink wrap is a shrink tube.

11. The method according to claim 9 further comprising the step of:
inserting a second layer of shrink wrap into said lamination slots.

* * * * *